March 16, 1954
C. D. STEWART
2,672,375
FLUID PRESSURE BRAKE APPARATUS
Filed Jan. 30, 1951
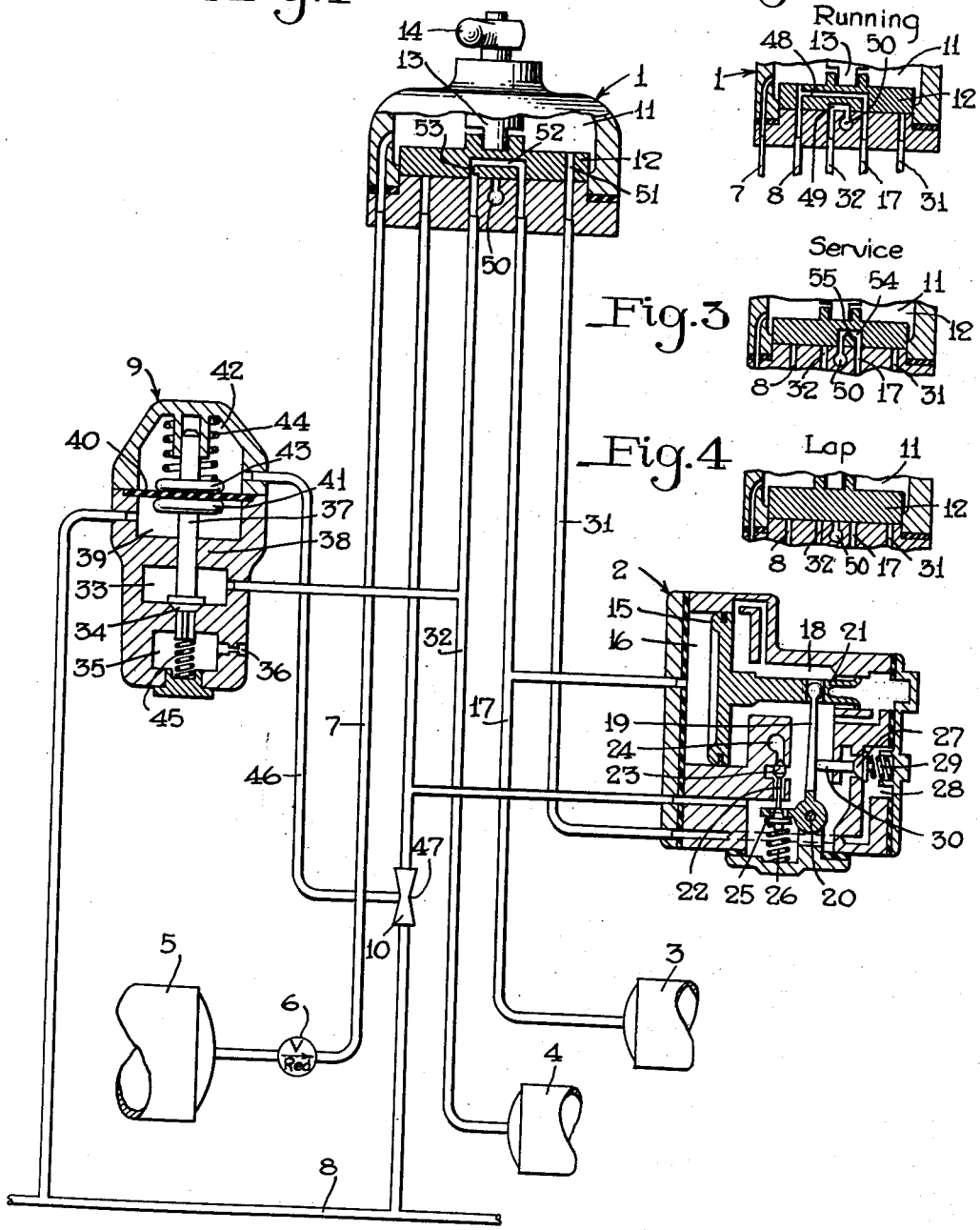
INVENTOR.
Carlton D. Stewart
BY
Frank E. Miller
ATTORNEY Patented Mar. 16, 1954

2,672,375

UNITED STATES PATENT OFFICE 2,672,375

FLUID PRESSURE BRAKE APPARATUS

Carlton D. Stewart, Pittsburgh, Pa., assignor to Westinghouse Air Brake Company, a corporation of Pennsylvania Application January 30, 1951, Serial No. 208,604

3 Claims. (Cl. 303—60)

This invention relates to fluid pressure brake apparatus and more particularly to the type used on locomotives for controlling application and release of brakes on the locomotive and connected cars of a train.

In Patent 2,038,168, issued on April 21, 1936, to C. C. Farmer, there is disclosed a fluid pressure brake apparatus for a locomotive embodying an engineer's brake valve device having in addition to the usual service position another service position now commonly known as first service position. In this first service position the usual equalizing reservoir is connected to a reduction limiting reservoir of such volume as to cause at the usual service rate about a six pound reduction in pressure in said equalizing reservoir and thereby in the brake pipe for effecting a light service application of brakes on a train to gently gather the train slack. In order to prevent leakage of fluid under pressure from the brake pipe increasing the reduction in brake pipe pressure and thereby the application of brakes over the substantially light slack gathering degree while the brake valve device is in first service position, the brake apparatus also includes a brake pipe maintaining valve for supplying fluid under pressure to the brake pipe to compensate for leakage of fluid under pressure therefrom.

The apparatus further comprises a vent from the reduction limiting reservoir through which, after the six-to-eight pound service reduction in pressure in the equalizing reservoir is effected by substantial equalization into the reduction limiting reservoir, the pressure in said equalizing reservoir will continue to reduce at a very slow rate for the following reason. Before the brake pipe on a train is fully charged a so called false gradient exists in the brake pipe, that is, there is a greater differential between the pressures in the brake pipe at the front and rear ends of the train than ever exists with maximum permissible leakage. If an application of brakes were initiated in first service position of the engineer's brake valve device while such a false gradient in the brake pipe is present, the brakes on all cars of a train will apply due to quick service operation of the well known AB brake controlling valve devices on the cars. The pressure in the brake pipe at the head of the train will then tend to reduce by flow to the rear of the train causing operation of the maintaining valve to supply fluid under pressure to the brake pipe at the head of the train, which, without the vent above mentioned, would result in the pressure in the brake pipe from a few cars back of the locomotive to the rear of the train being increased sufficiently to cause release of brakes, the brakes remaining applied only on said few cars adjacent the locomotive. However, the vent from the reduction limiting reservoir by continuing the reduction in pressure in the equalizing reservoir continues the reduction in pressure in the brake pipe at such a rate as to prevent sufficient increase in brake pipe pressure to the rear of the few cars above mentioned to cause release of the brakes on such cars, and thereby avoids the possibility of the train being placed in a hazardous condition when the engineer is not anticipating it.

After the slack in a train has been gathered by using first service position of the engineer's brake valve device as above described, said device will be moved to the usual service position for increasing the degree of brake application and finally to lap position for limiting the application to a desired degree, in the usual manner, the maintaining valve not operating to compensate for brake pipe leakage in either service or lap position of the brake valve device disclosed in the above mentioned patent.

With the equalizing reservoir pressure gradually reducing through the vent from the reduction limiting reservoir as above described, it will be noted that the brake pipe pressure will be maintained against leakage but will gradually reduce with the reduction in pressure in the equalizing reservoir, this type of maintaining being commonly known as fading maintaining.

In controlling a train down a long grade it is customary to cycle the brakes, that is, first make a desired degree of application and then, when brake pipe leakage increases the application to a certain extent, release the application down to the setting of the usual brake cylinder pressure retaining valve devices while recharging the train brake system, followed by effecting another application of brakes etc., the number of such cycles being usually governed by the length and continued to the bottom of the grade. It will be noted that during cycling of the brakes, as just described, the degree of train braking will vary as may also the speed of the train as a consequence, and that a lot of compressed air will be wasted in partially releasing brakes and then reapplying them, and unless sufficient recharge of the brake system is obtained during each cycle, insufficient braking may eventually result with disastrous results. It is to be further noted that the number of cycles necessary for the descent of any chosen grade could be greatly reduced if upon applying the brakes the brake pipe pressure could be held constant against leakage to prevent the application increasing to a degree necessitating release thereof. This constant type of maintaining might be called flat maintaining in that the pressure of fluid in the brake pipe would remain right at the desired reduced degree and the structure for providing such could differ from that which provides the fading maintaining above described only in that the vent from the reduction limiting reservoir would be closed in first service position of the engineer's brake valve device.

From the above, it will be seen that fading maintaining is particularly essential to avoid placing a train in jeopardy when an application of brakes is initiated at a time when a false gradient exists in the brake pipe, while flat maintaining could advantageously be employed in grade operation, and one object of the invention is the provision of an improved locomotive brake equipment embodying both of these features.

Another object of the invention is the provision of an improved locomotive brake equipment embodying means automatically adjustable according to the pressure gradient in a brake pipe to provide flat maintaining except when a false gradient exists under which condition fading maintaining will be provided for a train's safety.

Other objects and advantages will become apparent from the following more detailed description of the invention.

In the accompanying drawing, Fig. 1 is a diagrammatic view of a portion of a locomotive brake equipment embodying the invention; and Figs. 2 to 4 are diagrammatic views of a portion of an engineer's brake valve device shown in Fig. 1 but with the rotary valves thereof in different positions, respectively.

Description

For the purpose of illustration the brake apparatus embodying the invention may, as shown in the drawing, comprise an engineer's brake valve device 1, a combined equalizing discharge and maintaining valve device 2, an equalizing reservoir 3, a reduction limiting reservoir 4, a main reservoir 5, a feed valve device 6 for supplying fluid at a constant reduced pressure from the main reservoir 5 via a pipe 7 to the brake valve device 1, and a brake pipe 8. According to the invention the brake apparatus further comprises a maintaining selector valve device 9 and a Venturi choke device 10.

The brake valve device may be like that disclosed in the above referred to patent but, for illustrative purposes, comprises a casing having a chamber 11 adapted to be constantly supplied with fluid under pressure from the feed valve device 6 via pipe 7. A rotary valve 12 contained in chamber 11 is pressed against its seat by pressure of fluid in chamber 11 and is connected by a stem or key 13 to an engineer's brake valve handle 14 through the medium of which said valve is adapted to be turned to its different brake controlling positions including first service position, running position, service position and lap position in which said valve is shown in, respectively, Figs. 1 to 4 of the drawing.

The combined equalizing discharge and maintaining valve device 2 comprises a casing containing a piston 15 at one side of which is an equalizing reservoir chamber 16 open to a pipe 17 also connected to the equalizing reservoir 3 and seat of the brake valve rotary valve 12. At the opposite side of piston 15 is a chamber 18 open to the brake pipe 8. A bell crank 19 fulcrumed at its knee on a pin 20 mounted in the casing has one arm the end of which is connected to a stem 21 of the equalizing piston 15 for movement with said piston. Extending through an opening in the other arm of bell crank 19 is a stem 22 of a brake pipe discharge valve 23 arranged to cooperate with a seat in the casing to control communication between chamber 18 and an atmospheric passage 24. A collar 25 on stem 22 is provided for engagement by the respective arm of bell crank 19 to unseat the exhaust valve 23 upon rotation of the bell crank 19 in a counter-clockwise direction while a spring 26 acting on said collar is provided to urge said valve to its seat upon rotation of said bell crank in the opposite direction. A leakage maintaining valve 27 contained in a chamber 28 controls communication between said chamber and chamber 18 and is urged to its seat by a spring 29. The valve 27 has a stem 30 projecting into chamber 18 for engagement by an arm of the bell crank 19 whereby said valve will be unseated by said arm after closing of the exhaust valve 23 by clockwise rotation of said bell crank.

The maintaining valve chamber 28 is open through a pipe 31 to the seat of the brake valve rotary valve 12, as are also the equalizing reservoir pipe 17, a pipe 32 from the reduction limiting reservoir 4 and the brake pipe 8.

The maintaining selector valve device 9 comprises a casing having a chamber 33 to which pipe 32 is open and which contains a valve 34 for controlling communication between said chamber and a chamber 35 which is open to atmosphere through a restricted vent or passageway 36. The valve 34 has a stem 37 projecting through a partition wall 38 into a chamber 39 constantly open to the brake pipe 8. One end of chamber 39 is formed by a flexible diaphragm 40, the end of stem 37 being provided in chamber 39 with a followed head 41 engaging said diaphragm. At the opposite side of diaphragm 40 is a chamber 42 containing a follower 43 engaging the adjacent face of said diaphragm and urged thereagainst by a spring 44 acting on said follower. A spring 45 in chamber 35 acts on the valve 34 for urging it to open. Chamber 42 is open through a pipe 46 to the throat 47 of the Venturi choke device 10.

Operation

In operation, assume that the main reservoir 5 is charged with fluid under pressure in the usual manner and that by operation of the feed valve device 6 the rotary valve chamber 11 in the brake valve device 1 is supplied with fluid from said main reservoir at the reduced pressure which it is desired to normally carry in the brake pipe 8. Further assume that the rotary valve 12 of the brake valve device 1 is in running position (Fig. 2).

With the rotary valve 12 in running position, fluid at feed valve pressure will flow from the rotary valve chamber 11 through a passageway 48 to the brake pipe 8 and chamber 18 in the equalizing discharge valve mechanism 2 and also to pipe 17 and thence to the equalizing reservoir 3 and chamber 16 in said mechanism, whereby said brake pipe, reservoir, and chambers will become charged to the pressure provided by the feed valve device 6. Also in running position of the rotary valve 12 pipe 32 and thereby the reduction limiting reservoir 4 will be vented via a cavity 49 in said valve and an atmospheric passage

50. With chambers 16, 18 at opposite sides of the equalizing piston 15 thus charged with fluid at substantially the same pressures the equalizing piston 15 will assume a position such as it is shown in the drawing permitting closing of the brake pipe discharge valve 23 and maintaining valve 27 by the respective springs 26, 29.

If it is now desired to effect a service application of brakes, the brake valve handle 14 and thereby the rotary valve 12 will be turned to first service position in which it is shown in Fig. 1. In this position the rotary valve 12 will lap the brake pipe 8 cutting off further supply of fluid under pressure thereto, a port 51 in said valve will open valve chamber 11 to the maintaining valve pipe 31 and a passageway 52 in said valve will open the equalizing reservoir pipe 17 to the reduction limiting reservoir pipe 32. Pressure of fluid in the equalizing reservoir 3 and piston chamber 16 will then equalize substantially into the reduction limiting reservoir at the usual service rate controlled by a choke 53 in the passageway 52.

When the supply of fluid under pressure to the brake pipe 8 is cut off by moving the brake valve device to first service position, leakage from the brake pipe, usually present in trains, will start to reduce the pressure therein and thereby in chamber 18 of the device 2, but if the rate of such reduction does not exceed the service rate of reduction in pressure in the equalizing reservoir 3 and piston chamber 16, then when the pressure in chamber 16 becomes reduced slightly below brake pipe pressure in chamber 18, the piston 15 will move toward chamber 16 and actuate bell crank 19 to open the brake pipe discharge valve 23 sufficient to increase the rate of reduction in pressure in brake pipe 8 to the service rate of reduction in equalizing reservoir pressure in chamber 16. Movement of piston 15 will then cease until the brake pipe pressure in chamber 18 becomes reduced slightly below the limited reduction in equalizing reservoir pressure in chamber 16 whereupon the piston 15 will move toward chamber 18 to permit seating of the discharge valve 23. When the discharge valve 23 is thus closed leakage of fluid under pressure from the brake pipe will however continue to reduce pressure in the brake pipe 8 and piston chamber 18 whereby the piston 15 will continue movement toward chamber 18 and thereby actuate the bell crank 19 to open the maintaining valve 27 to a degree to supply fluid under pressure to chamber 18 and the brake pipe 8 at a rate to prevent further reduction in such pressure by leakage, whereupon movement of piston 15 will cease.

If the leakage of fluid under pressure from the brake pipe is such as would cause a reduction in pressure therein at a rate exceeding a service rate, when the brake valve device is turned to first service position, the brake pipe pressure in chamber 18 will reduce faster than pressure in the equalizing reservoir and chamber 16 is reduced. Then when the brake pipe pressure in chamber 18 becomes reduced slightly below the reducing pressure in chamber 16, the equalizing piston 15 will move toward chamber 18 and open the maintaining valve 27 to a degree sufficient to supply fluid to the brake pipe 8 to compensate for the leakage of fluid under pressure therefrom whereupon movement of said piston will cease.

If a false gradient exists in the brake pipe 8 at the time the brake valve device is moved to first service position and under which condition there will be a more rapid rate of runaway of fluid under pressure from the brake pipe at the locomotive toward the rear of the train than ever exists with maximum permissible leakage of fluid under pressure from the brake pipe, then the maintaining valve 27 will open to a greater degree than above described in order to supply more fluid under pressure to the brake pipe as necessary to prevent the pressure therein at the locomotive reducing faster than the service rate of reduction in pressure in the equalizing reservoir 3 and equalizing piston chamber 16.

It will be noted that the fluid under pressure supplied to the brake pipe 8 by the maintaining valve 27 flows through the Venturi choke device 10 which flow will reduce the pressure in pipe 45 and chamber 42 of the maintaining selector valve device 9 to below brake pipe pressure acting in chamber 39 on the opposite side of diaphragm 40 by a degree proportionate to the rate of such flow which is necessary to prevent brake pipe pressure reducing faster than the service rate of reduction in pressure in the equalizing reservoir 3. Thus the pressure in chamber 42 will be reduced to a lower degree when the brake valve device is moved to first service position at the time a false gradient is present in the brake pipe 8 than when there is no false gradient but, instead, only leakage even up to a maximum permissible degree.

The spring 44 acts on diaphragm 40 with such force as to hold valve 34 seated for all pressures of fluid in chamber 42, with respect to brake pipe pressure in chamber 39, except that which will be obtained when the maintaining valve 27 is operating to supply fluid to the brake pipe 8 to compensate for the tendency to drop therein due to greater than permissible brake pipe leakage and hence when there is a false gradient in the brake pipe at the time the brake valve device is moved to first service position.

Therefore when the brake valve device is moved to first service position to initiate an application of brakes when there is no false gradient in the brake pipe the valve 34 will be closed so as to prevent venting of fluid under pressure from the reduction limiting reservoir 4. The consequent reduction in brake pipe pressure will therefore be limited to equalization of pressure of fluid in the equalizing reservoir 3 into the reduction limiting reservoir 4 at a service rate, the maintaining valve 27 operating to provide a like rate and degree of reduction in pressure in brake pipe 8, which will ensure gentle gathering of slack in a long train having up to maximum permissible leakage of fluid under pressure from said brake pipe.

If a false brake pipe gradient exists however at the time of initiating the service reduction in brake pipe pressure, the valve 34 will be opened to permit venting of fluid under pressure from the reduction limiting reservoir 4 through the restricted vent 36, whereby after substantial equalization of pressure of fluid in the equalizing reservoir 3 into the reduction limiting reservoir 4 at a service rate, such pressure will continue to reduce at a slower rate governed by the flow capacity of the vent 36. Thus after the initial limited reduction in pressure in the brake pipe at a service rate the reduction will continue at a slower rate governed by vent 36 as necessary under this particular condition to prevent the hereinbefore described undesired release of brakes on the cars of a train from a few cars back from the locomotive to the rear end of the train.

After the slack in a train has been gently gathered by use of the first service position of the brake valve device, as above described, the brake valve device will be moved to the usual service position (Fig. 3) in which the equalizing reservoir 3 is connected to the atmospheric passage 50 through a passage 54 containing a service choke 55 in the rotary valve 12. After a desired further reduction in pressure in the equalizing reservoir 3 is thereby effected to cause a corresponding desired degree of increase in braking of the locomotive and cars of a train the brake valve device will ordinarily be moved to the usual lap position (Fig. 4) in which pipe 17 is lapped to prevent further reduction in pressure in the equalizing reservoir 3 and thereby in the brake pipe to limit the brake application to a desired degree in the well known manner.

In controlling a train down a grade the initial application of brakes will be initiated in first service position of the brake valve device the same as above described, the valve 34 being either open or closed, respectively, according to whether a false gradient is present or not present in the brake pipe. If a false gradient is present at the time of initiating the brake application, it will have disappeared shortly after initiation so that valve 34 will be closed for limiting further reduction in equalizing reservoir pressure to equalization into the reduction limiting reservoir.

After the slack in the train has been gathered by the use of first service position, the brake valve device 1 will be moved to service position to effect a further reduction in pressure in equalizing reservoir 3 as necessary to obtain the desired degree of brake application. After the desired reduction in pressure in the equalizing reservoir 3 has been completed, the brake valve device will be moved back to the first service position, instead of lap position which might be employed except for grade operation, for providing flat maintaining to hold the brakes applied at the desired degree.

More specifically, in service position the reduction limiting reservoir 4 may be vented or, as shown in the drawing, the pipe 17 may be lapped by rotary valve 12 in the brake valve device to hold the fluid pressure in said reservoir provided in first service position, the valve 34 being also closed as above mentioned. Thus when the brake valve device is turned from service position back to first service position the equalizing reservoir 3 will be connected to the reduction limiting reservoir 4. At this time of reconnecting, the reduction limiting reservoir will be charged to a higher pressure than present in the equalizing reservoir 3 and such pressures will promptly equalize increasing the pressure in the equalizing reservoir. Such increase will be slight, however, since the volume of the reduction limiting reservoir is only perhaps ten per cent that of the equalizing reservoir and from a practical standpoint such theoretical slight increase is immaterial. It is merely important to note that in first service position the fluid pressure in the equalizing reservoir 3 is bottled up at substantially the desired reduced degree and that via port 51 in the brake valve rotary valve 12 fluid under pressure will be supplied to the maintaining valve 27 whereby the equalizing discharge valve mechanism 2 will operate in the same manner as hereinbefore described to supply fluid under pressure to the brake pipe 3 to maintain the pressure therein substantially equal to the reduced equalizing reservoir pressure, this flat maintaining therefore preventing leakage of fluid under pressure from the brake pipe increasing the degree of brake application on the train above that desired.

Except in case of need for varying the degree of brake application while descending a grade, the initial application could remain effective during the whole descent, the flat maintaining preventing change in said application. If it becomes necessary to increase the application the brake pipe pressure could be further reduced whereupon the application would be increased and the flat maintaining of brake pipe pressure would hold the application at the desired increased degree. If however it becomes necessary to reduce the degree of brake application, as in case of decrease in steepness of the grade, then it would be necessary to recharge the brake system back to substantially normal pressure during which time the usual retaining valve devices on the cars could be employed to prevent a full release of brakes. Upon obtaining recharge of the brake system, a reapplication of brakes to suit the grade could then be effected. It will therefore be seen that by use of flat maintaining the number of cycles of brake application and release on a train may be reduced to an absolute minimum in contrast to present practice not employing flat maintaining where a relatively large number of cycles are essential to hold a train within desired limits of speed.

*Summary*

It will now be seen that I have provided means for automatically selecting the type of brake pipe maintenance against leakage particularly suitable for different train operating conditions, in that fading maintaining will automatically be provided when necessary for the safety of a train as in case of a false brake pipe gradient, but otherwise flat maintaining will be provided as particularly desirable for controlling a train down a grade.

Having now described by invention, what I claim as new and desire to secure by Letters Patent, is:

1. In a brake apparatus, in combination, a brake pipe, an equalizing reservoir normally charged with fluid at the pressure in said brake pipe, a normally vented reduction limiting reservoir, a brake valve device for opening said equalizing reservoir to said reduction limiting reservoir for reducing the pressure in said equalizing reservoir, an equalizing device controlled by opposing pressures in said equalizing reservoir and brake pipe and operative upon a reduction in pressure in said equalizing reservoir to either vent fluid under pressure from said brake pipe or to supply fluid under pressure to said brake pipe as necessary to maintain brake pipe pressure substantially equal to that in said equalizing reservoir, a vent for said reduction limiting reservoir, a valve for opening and closing said vent, a movable abutment subject on one side to fluid at the pressure in said brake pipe and subject on the opposite side to fluid at a pressure which varies according to rate of flow of fluid under pressure to said brake pipe by operation of said equalizing device, and spring means acting with the pressure of fluid acting on said opposite side of said abutment to hold said valve closing said vent against pressure of fluid on said one side except when pressure of fluid on said opposite side is less than a chosen degree.

2. In a brake apparatus, in combination, a brake pipe, an equalizing reservoir normally charged with fluid at the pressure in said brake pipe, a normally vented reduction limiting reservoir, a brake valve device for opening said equalizing reservoir to said reduction limiting reservoir for reducing the pressure in said equalizng reservoir, an equalizing device controlled by opposing pressures in said equalizing reservoir and brake pipe and operative upon a reduction in pressure in said equalizing reservoir to either vent fluid under pressure from said brake pipe or to supply fluid under pressure to said brake pipe as necessary to maintain brake pipe pressure substantially equal to that in said equalizing reservoir, a vent for said reduction limiting reservoir, a valve for opening and closing said vent, and means operative according to flow of fluid under pressure to said brake pipe by said equalizing device for operating said valve to open said vent when the flow exceeds a chosen degree and to close said valve at other times.

3. In a brake apparatus, in combination, a brake pipe, an equalizing reservoir normally charged with fluid at the pressure in said brake pipe, a normally vented reduction limiting reservoir, a brake valve device for opening said equalizing reservoir to said reduction limiting reservoir for reducing the pressure in said equalizing reservoir, an equalizing device controlled by opposing pressures in said equalizing reservoir and brake pipe and operative upon a reduction in pressure in said equalizing reservoir to either vent fluid under pressure from said brake pipe or to supply fluid under pressure to said brake pipe as necessary to maintain brake pipe pressure substantially equal to that in said equalizing reservoir, a Venturi device in the flow connection between said equalizing device and said brake pipe, movable abutment means subject to pressure in said brake pipe opposing pressure of fluid at the throat of said Venturi device, a vent from said reduction reservoir, and valve means operable by said abutment means to open said vent upon a chosen difference between pressures in said brake pipe and throat of said Venturi device and to close said vent upon a difference less than said chosen difference.

CARLTON D. STEWART.

References Cited in the file of this patent

UNITED STATES PATENTS

| Number | Name | Date |
|---|---|---|
| 1,914,623 | Thomas | June 20, 1933 |
| 2,322,042 | McClure | June 15, 1943 |

OTHER REFERENCES

No. 8 E. T. Locomotive Brake Equip. W. A. B. Co., Pittsburgh, Pa. Instruction Pamphlet 5032-1, May 1935, p. 31.